United States Patent
La Forest et al.

(10) Patent No.: US 7,198,739 B2
(45) Date of Patent: Apr. 3, 2007

(54) MANUFACTURE OF THICK PREFORM COMPOSITES VIA MULTIPLE PRE-SHAPED FABRIC MAT LAYERS

(75) Inventors: Mark L. La Forest, Granger, IN (US); Nabil Abu Gharbieh, Granger, IN (US); Raymond J. Cipra, West Lafayette, IN (US); Alan E. Fatz, Centerville, OH (US); Thomas H. Siegmund, West Lafayette, IN (US)

(73) Assignee: Honeywell International Inc., Morris Township, NJ (US)

( * ) Notice: Subject to any disclaimer, the term of this patent is extended or adjusted under 35 U.S.C. 154(b) by 148 days.

(21) Appl. No.: 10/852,992

(22) Filed: May 25, 2004

(65) Prior Publication Data

US 2005/0266203 A1 Dec. 1, 2005

(51) Int. Cl.
*B29C 70/12* (2006.01)
*B29C 70/34* (2006.01)
*B32B 3/02* (2006.01)

(52) U.S. Cl. .............. 264/29.2; 264/29.3; 264/29.7; 264/119; 264/121; 264/131; 264/257; 264/258; 156/89.26; 156/93

(58) Field of Classification Search ...... 264/29.1–29.2, 264/29.5–29.6, 119, 121, 131, 257, 258, 255; 156/89.25, 89.26, 93
See application file for complete search history.

(56) References Cited

U.S. PATENT DOCUMENTS 4,221,622 A 9/1980 Slonina et al.
4,396,663 A 8/1983 Mitchell et al.
4,454,190 A 6/1984 Katagiri
4,514,240 A 4/1985 Heraud
4,790,052 A * 12/1988 Olry ............................. 28/110
4,867,086 A 9/1989 Vees et al.
5,184,387 A 2/1993 Lawton et al.

(Continued)

FOREIGN PATENT DOCUMENTS

WO WO 96/32527 * 10/1996

OTHER PUBLICATIONS

Klosterman et al, *Composites Part A*, 29A, 1165-1174 (Elsevier Science Ltd.—1998).

(Continued)

*Primary Examiner*—Stefan Staicovici
(74) *Attorney, Agent, or Firm*—Birch, Stewart, Kolasch & Birch, LLP

(57) ABSTRACT

Preform for carbon-carbon composite part (55) comprising multiple layers of fibrous mats (51, 52, 53) wherein each mat (51, 52, 53) comprises random carbon-containing fibrous matrix (11) having polymeric binder distributed therein and wherein adjacent mats (51, 52, 53) are bound together by additional polymer binder, stitching, and interlocking tabs. Also, method of manufacturing thick multi-layer composite preform, by: providing optionally reconfigurable tool including perforated screen through which vacuum can be drawn; delivering chopped fibers (b) to the tool while drawing vacuum therethrough to form fibrous object; delivering binder (c) to the fibrous object; melting or curing the binder (d) to make a fibrous mat (51, 52, 53); assembling plurality of the fibrous mats (51, 52, 53) and additional binder into the shape of a preform (e); and heat-pressing the resulting mat assembly (f) into finished thick preform (55).

5 Claims, 5 Drawing Sheets

U.S. PATENT DOCUMENTS

| | | |
|---|---|---|
| 5,217,770 A | 6/1993 | Morris et al. |
| 5,282,734 A | 2/1994 | Pastureau et al. |
| 5,376,327 A * | 12/1994 | Di Natale et al. .......... 264/517 |
| 5,439,627 A | 8/1995 | De Jager |
| 5,599,603 A * | 2/1997 | Evans et al. ............... 428/66.2 |
| 5,654,059 A | 8/1997 | Hecht |
| 5,705,008 A | 1/1998 | Hecht |
| 6,013,371 A | 1/2000 | Hager et al. |
| 6,080,343 A * | 6/2000 | Kaufman et al. .......... 264/40.5 |
| 6,365,257 B1 | 4/2002 | Hecht |
| 6,476,122 B1 | 11/2002 | Leyden |
| 6,478,926 B1 | 11/2002 | Brachos et al. |
| 6,521,152 B1 * | 2/2003 | Wood et al. ................ 264/121 |
| 6,585,930 B2 | 7/2003 | Liu et al. |
| 6,630,093 B1 | 10/2003 | Jones |
| 6,655,481 B2 | 12/2003 | Findley et al. |
| 6,660,209 B2 | 12/2003 | Leyden et al. |
| 2003/0136502 A1 * | 7/2003 | Lavasserie et al. ......... 156/253 |

OTHER PUBLICATIONS

Tari et al, *Composites Part A*, 29A, 651-661 (Elsevier Science Ltd.—1998).

* cited by examiner

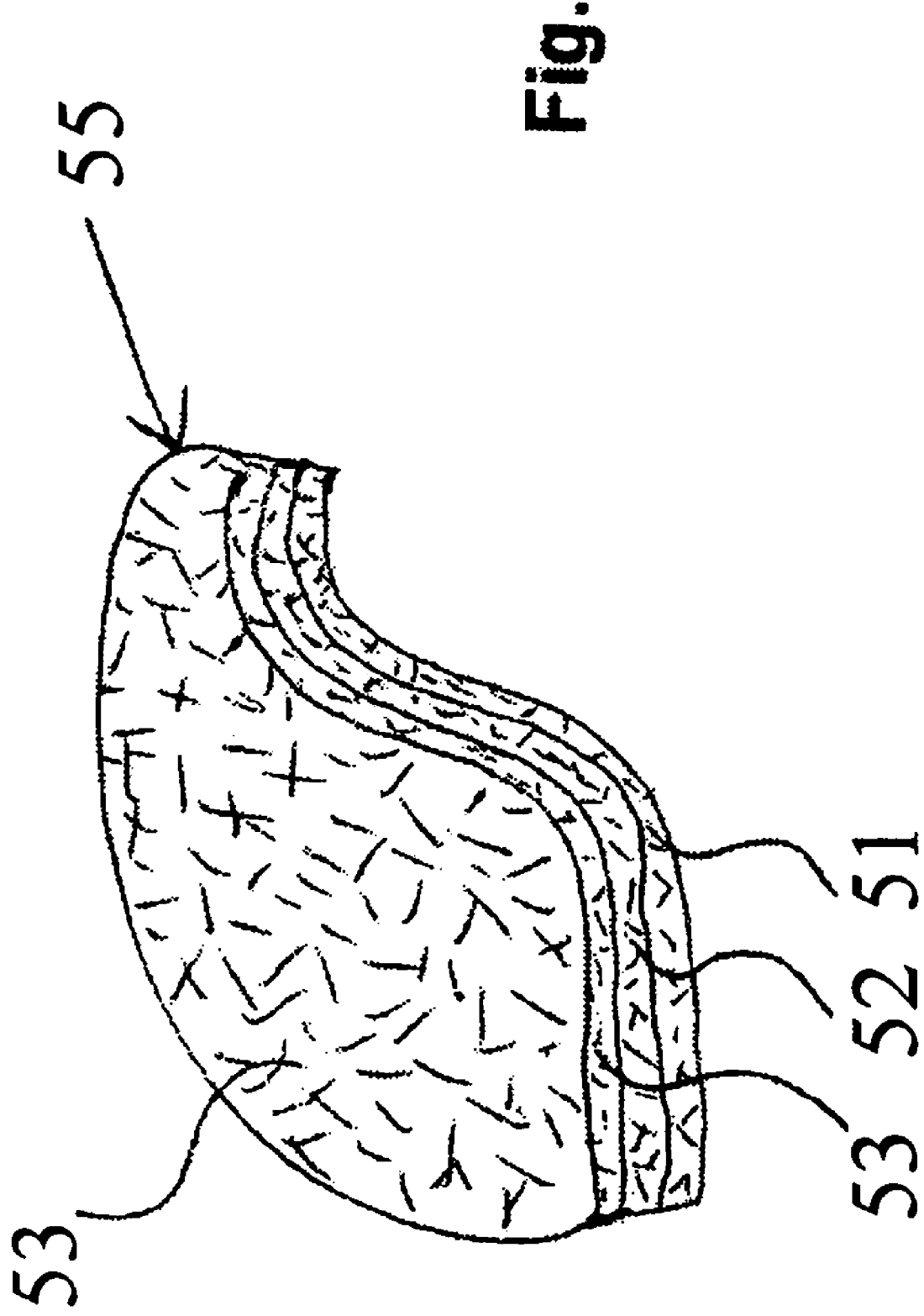

MANUFACTURE OF THICK PREFORM COMPOSITES VIA MULTIPLE PRE-SHAPED FABRIC MAT LAYERS

BACKGROUND

The present invention relates to a method of producing preform parts by layering fibrous objects. The fibrous objects that are layered in this invention are nonwoven fiber mats produced, by a spray deposition process. The present invention is particularly well adapted for the use of near-net shape fiber mats, that is, mats whose relevant dimensions are quite close to the corresponding dimensions of the final product being manufactured. This significantly reduces the amount of cutting processes and corresponding material waste in the manufacture of the desired preforms and the final composite parts made from these preforms. The present invention is particularly advantageous in the manufacture of carbon-carbon brake discs due to the high raw material and processing cost for this type of material.

Composite materials are materials of choice in many industrial applications, including the application of carbon-carbon composites to brake components. In these carbon-carbon composite materials, fibers and matrix components are combined to provide a desirable material architecture. Features of microstructural design that can be varied include fiber length (short to continuous), reinforcement type (e.g., pitch or PAN, etc.), reinforcement architecture (woven or nonwoven), reinforcement configuration (planar or three-dimensional), and reinforcement orientation. In the manufacturing of carbon-carbon composite materials an initial preform is produced, which already includes the microstructural design of the final composite part. This preform is later densified by a series of techniques.

Two technologies of particular interest are the Programmable Powder Preform Process ("P4") and Laminated Object Manufacturing ("LOM").

The Programmable Powder Preform Process is a fully automated process for chopping and spraying fibers to produce a fiber mat. With appropriate automated control of the fiber deposition, the P4 process enables the creation of fiber mats with complex shapes of both defined outer contour and three-dimensional shape. The P4 process consists of two major steps. A computer controlled chopper head with rotation knives, generally mounted on a six-axis robot, is used to cut continuous fiber tow into segments of defined length. Fiber tow segments are then sprayed or dropped onto a planar or spatially contoured surface. The surface may be, for instance, a screen of perforated sheet metal. The screen is generally connected to a vacuum system, and the vacuum holds the fiber tow segments temporarily in place on the screen. A small amount of polymeric powder is applied to the fibers as binder. The next step is the consolidation of the mat by melting of the binder, such that the fibers are held in position and the mat can be manipulated. Once the mat is treated in this manner, it can be removed from the screen and is capable of holding its shape for further handling and processing. Current commercial P4 systems have the major disadvantage that they can be used only to manufacture thin-walled or shell-type composite structures—they cannot be used to make preform for thick composite parts. This disadvantage of current P4 processing is overcome by the present invention.

Laminated Object Manufacturing is used to fabricate parts by stacking material layers upon one another. Materials conventionally used in LOM are sheets of paper, green ceramic tape, or composite fabrics (prepregs). In currently used LOM processes, the required outline of the individual layers of the material being processed is cut (for example by a laser) from a continuous feed or from rectangular plates of the material. The cutting tool (e.g. the laser) then scribes the remaining material in each layer to a crosshatch pattern of small squares. The crosshatched part ultimately allows for removal of the final structure as the process is completed. An individual layer is adhered to the previously deposited layer by an adhesive on the backside of the layer. The application of LOM to composite manufacturing was addressed in Klosterman et al., "Interfacial Characteristics of Composites Fabricated by Laminated Object Manufacturing", *Composites Part A: Applied Science and Manufacturing*, Vol. 29:9–10, pp 1165–1174 (1998), and in Tari et al., "Rapid Prototyping of Composite Parts Using Resin Transfer Molding and Laminated Object Manufacturing", *Composites Part A: Applied Science and Manufacturing*, Vol. 29:5–6, pp. 651–666 (1998). See also U.S. Pat. Nos. 6,476,122; 6,585,930; 6,630,093; 6,655,481; and 6,660,209. Conventional flat parts are produced on a flat base plate, while curved composite laminates can be produced on shaped mandrels. Nevertheless, each individual layer is initially planar. In composite manufacturing with LOM, the draping characteristics of the composite intend for use is a factor determinative of its suitability for use in the LOM procedure.

LOM processes have major disadvantages for fabricating composite structures. The cutting process is an essential step in the process. This cutting process is inefficient in its use of material, and a large quantity of scrap material is produced. This scrap rate becomes unacceptable if material costs are to be reduced. Building structures with internal cavities is limited, as additional cutting and lift-up processes have to be included in such cases. The incorporation of gradients in material properties within the LOM is limited to a layering approach. That is, gradients can be achieved only across the stacking direction. The planar build technique does not allow for interconnection between the individual layers beyond the adhesive used to bond the individual layers. Finally, the LOM process is limited to the assembly of initially flat sheets of material. Curved layer object manufacturing as it exists today produces parts in which the curved layers are stacked onto a shaped mandrel. As a consequence all layers in the final product will then be in parallel to each other. The planar build technique does not allow for interconnection between the individual layers beyond the adhesive use to bond the individual layers. Such disadvantages of current LOM processes are overcome by the present invention.

The patent literature in the field of the present invention is well developed. U.S. Pat. No. 4,867,086 teaches stitching a continuous tow of structural yarn to a substrate in the preparation of multi-layer fiber/resin composites. U.S. Pat. No. 5,184,387 relates to needle punching in the production of multi-layer composites. U.S. Pat. No. 5,217,770 teaches structures that may include a plurality of helically wound braided tapes in the production of composites. U.S. Pat. No. 5,439,627 discloses a method of manufacturing composites which includes chopping a green tape or ribbon, mixing it with binder, and forming moldings from the mixture. U.S. Pat. No. 6,013,371 relates to the production of near net shape carbon pistons and other artifacts by sintering petroleum pitch powders, preferably with pitch-base carbon fibers. U.S. Pat. No. 6,365,257 teaches the fabrication of thick, three-dimensional preforms comprising fibers disposed as chords of a circle. U.S. Pat. No. 6,478,926 relates to the formation of structural preforms from electromagnetic energy-activated binder and reinforcing material. U.S. Pat. Nos. 5,654, 059 and 5,705,008 disclose the fabrication of thick, three-dimensional structures comprising discontinuous thermoset pitch fiber. Claim 4 of the '008 patent recites "A method for producing a fibrous preform comprising the steps of: providing shaping means for holding fiber; placing discontinuous thermoset pitch fiber having a length greater than about 0.5 inch into said shaping means and forming a mat having a thickness in a range of from about ½ inch to about 4 inches and a density of from about 0.3 to about 0.6 g/cc; needle punching said mat at a needle density of from about 100 to about 10,000 per square inch to form filaments bundles and re-orient a portion of said filament bundles in the needled direction, thereby providing a three-dimensional filamentary structure; and carbonizing said filamentary structure by heating in an inert atmosphere to a temperature greater than about 1000° C. to provide a porous carbon preform". All of these patents contain disclosure that is illustrative of the state of the relevant art and the knowledge available to those skilled in the art, and the disclosure of each of the above patents is hereby expressly incorporated by reference.

VARIABILITY IN COMPOSITE ARCHITECTURE. The present invention provides the ability to fabricate parts with a predefined internal composite architecture. Each individual layer used to build the composite preform should allow for an internal structure optimized for desired properties. This internal microstructure can be based on variations in fiber volume fraction, fiber type, fiber length, and orientation. This invention allows one to introduce such variations is material characteristics in targeted areas within the final three-dimensional product. With this invention, it is even possible to embed objects (dense material components of differing composition and properties) into the preform, if such is desired to provide enhanced properties.

NON-PLANAR MICROSTRUCTURES AND LAYER CONNECTIVITY. The present invention also provides an extension of the capabilities of Laminate Object Manufacturing to the fabrication of objects assembled of non-planar microstructures. Fibrous mats can be produced on contoured vacuum screens as well as on flat vacuum screens. Assembling such fibrous mats allows for the design of complex microstructures that are not achievable with other processes, and provides the capability for near-net shape. In carbon-carbon brake preforms, where interlaminar shear is an important factor, the interlocking of individual fiber mat layers can be accomplished. This can be achieved, for instance, by incorporating matching lugs and tabs into the individual layers, such that a form-fitting load transfer between layers is achieved. Furthermore, three-dimensionally shaped fiber mats can be used as components of the assembly.

NEAR-NET SHAPE. The process of the present invention, with its ability to assemble individual fibrous mats into a unitary preform having a desired shape, reduces or even eliminates cutting processes that are conventionally required to finish a preform. This significantly reduces material waste, as well as simplifying overall processing. Moreover, the lack of necessity for extensive cutting facilitates the manufacture of preforms for composite parts having internal cavities.

MANUFACTURE OF CARBON-CARBON COMPOSITES. The present invention can advantageously be applied to the manufacture of carbon-carbon composite brakes, where preforms made of carbon fibers in a pitch matrix represent an intermediate step in the production of the final product. In making such preforms with the present invention, pitch and polyacrylonitrile (PAN) fibers can be mixed, and fiber orientation can be adjusted to preferred load transfer conditions, especially in the lug areas and heat transfer directions. The out-of-plane direction introduced in this manner will also aid in heat transfer away from the friction surface. Locations near the friction surface can be optimized for wear and friction, while the remainder of the part can be optimized for heat storage and strength.

SUMMARY OF THE INVENTION

The system of this invention comprises an automated process for chopping and spraying fiber tow segments onto a perforated screen through which a vacuum is drawn. The deposition of the fiber tow segments, including such aspects as their type, their length, the mass rate of their deposition, and their orientation within the form, may be controlled by a computer. Cutting of continuous fiber tows may be accomplished within a computer-controlled chopper head with rotation knives mounted, for instance, on a six-axis robot. The chopping and spraying device may be connected to a device that allows for the orientation of fiber tows in desired directions. Those skilled in the art are familiar with such computer-controlled fiber deposition.

In accordance with this invention, chopped fiber tow segments are sprayed onto a screen through which a vacuum is being drawn. On the vacuum screen, an optionally reconfigurable tool is positioned that produces the desired outer (and inner if desired) outline of the fiber mat. A computer program controls the motion of the spray within the area within the form, such that a desired fiber coverage as well as fiber tow orientation is obtained. Fiber tow orientation is accomplished by the use of a fiber tow orientation device attached to the chopping device, or by a programmed interaction of the fiber tow spray with the walls defining the outer (and inner if any) mat contour. A polymeric binder is also applied, preferably together with the fiber tow spray.

The fiber mat is consolidation by curing or melting the binder, for instance by heating or by subjecting the binder-containing mat to ultraviolet light. Next, the form or tool providing the outer (and possibly inner) contours of the fiber mat is removed. Once the mat is such consolidated, it is removed from the screen. At this point, the fibrous mat is capable of holding its shape for further handling and processing.

To manufacture preforms for thick multi-layer composite parts, a series of shaped fiber mats are stacked and fit together to achieve interlayer connectivity in a predefined sequence. Needling may be used to increase the interlaminar connectivity within the multi-layer preform. In contrast to conventional Laminated Object Manufacturing processes, in the present process there is no need at this stage to cut the individual layers into their final shape, because they have been given the desired shape during the processing described above.

In the application of this invention to the manufacture of preforms for carbon-carbon composite parts, additional binder, generally phenolic resin, is placed between the individual laminates. The binder, for instance phenolic resin binder, can be applied by spraying on the binder as a liquid, by adding the binder as a powder deposition, or by the use of sheets (e.g., in a technique known as Resin Film Infusion). Alternatively, a Resin Transfer Molding process can be applied together with a constraint fixture which holds the fiber mats in place during infiltration. The stack is then placed into a mold and heated. Subsequently, a press is used to compact the preform and to achieve the desired density. For carbon-carbon brake applications, the composite preform will then be subjected to processes leading to carbonization and finally to densification.

BRIEF DESCRIPTION OF THE DRAWINGS

The present invention may be more fully understood from the detailed description given hereinbelow and from the accompanying drawings. The drawings, which are not to scale, are given by way of illustration only and are not intended to limit the invention.

FIG. 5 is a perspective view of a thick multi-layer composite article of the invention.

DETAILED DESCRIPTION

This invention provides a process for the manufacture of preforms for thick structural composite parts. In accordance with this invention, individual layers of fiber mats with defined microstructure are produced by means of a fiber spray system. The individual fiber mats are subsequently stacked to make a multi-layer composite preform. The individual fiber mats are interlinked, for example by needling of the three-dimensional preform or by the use of tabs and lugs built into the individual fiber mats or by virtue of three-dimensionality in the individual fiber mats themselves. The fiber preform is densified by resin infiltration. The novel manufacturing apparatus, comprising one or more fiber spray-up and layer assembly stations, also constitutes an aspect of this invention.

Figure 1:
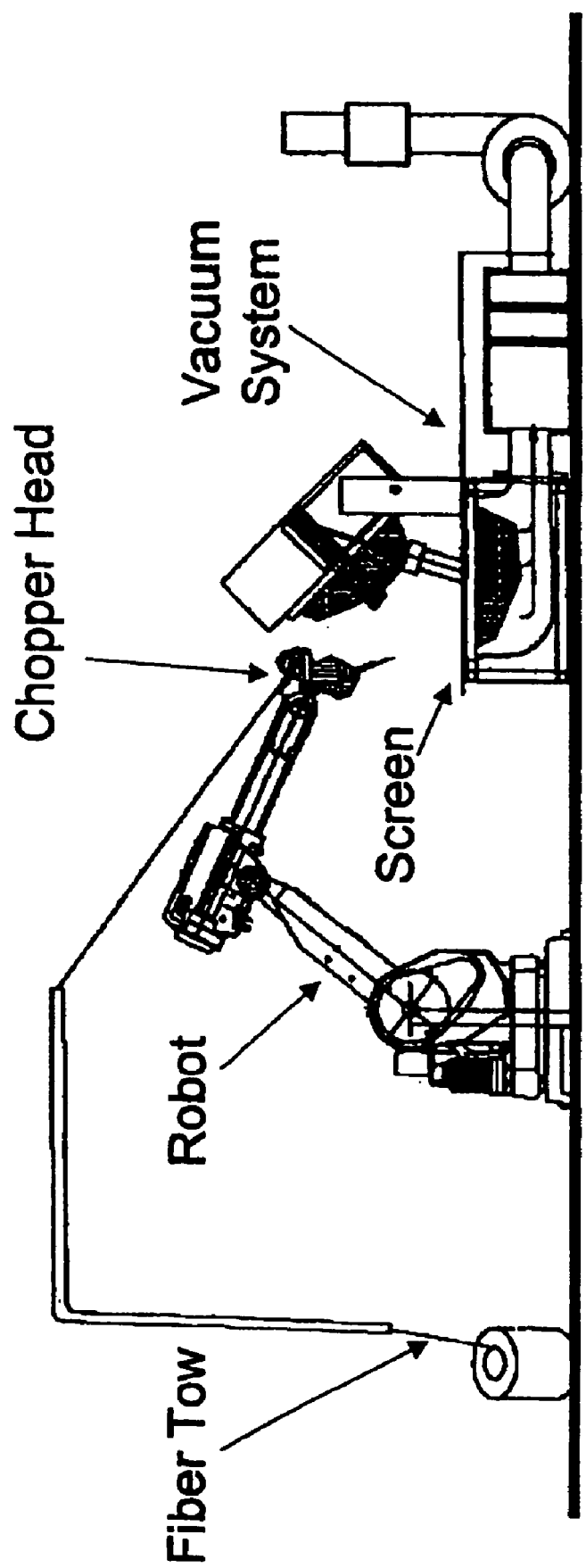
FIG. 1 illustrates features of an apparatus that may be used to practice certain aspects of the present invention.

The present inventive system for the fabrication of preforms for thick, three-dimensional composite parts includes various components. One component of this invention is a robotic process for chopping continuous fiber tows and spraying the chopped fiber tows, with control over fiber type (that is, different types of fiber can be mixed to make the fiber mats of this invention), fiber tow segment length and orientation, and fiber output rates. In accordance with this invention, the chopped fiber tow segments are sprayed onto a screen to which is operatively connected to a vacuum. An apparatus for accomplishing this aspect of the invention is illustrated in FIG. 1. The vacuum settles the fiber tow segments as they are sprayed into a form and holds them against the screen. The screen will define the three-dimensional contour of a fiber mat.

Figure 2:
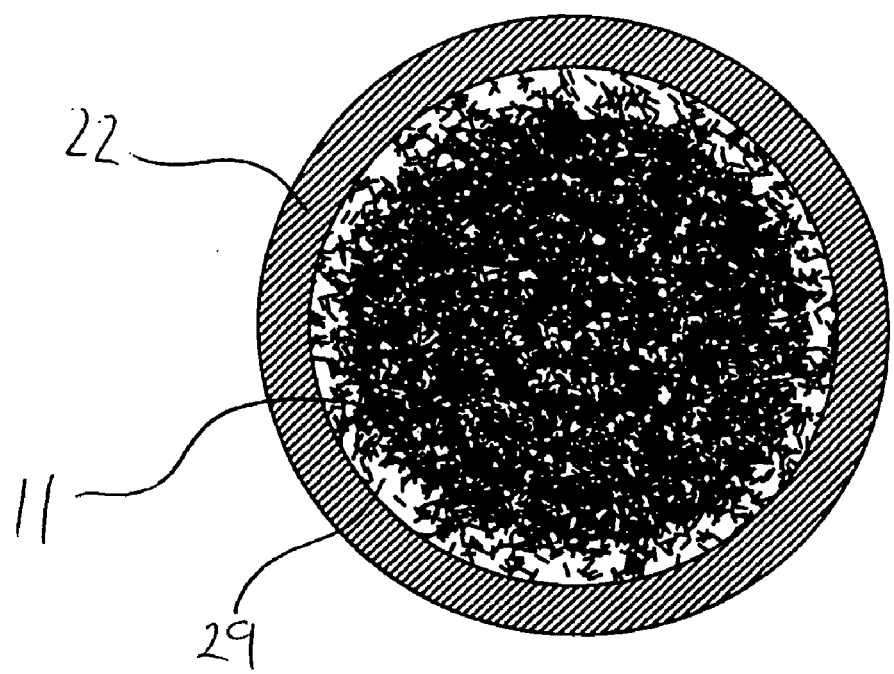
FIG. 2 is a plan view of a fiber-filled tool in accordance with the present invention.
Figure 3:
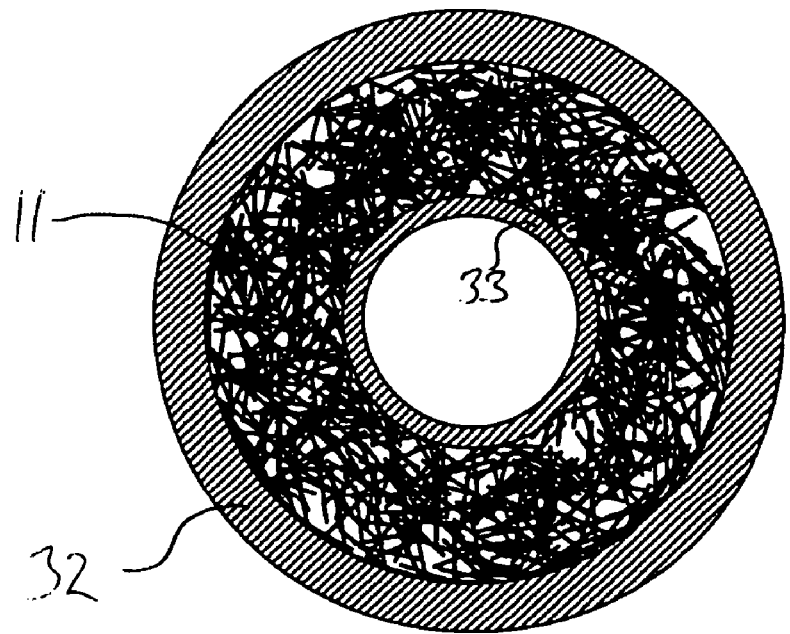
FIG. 3 is a plan view of another fiber-filled tool in accordance with this invention.

Another aspect of this invention is the use of reconfigurable forms (or tools) to provide the side contours of the desired fiber mats. A form is used to provide the outer shape (and that of internal cavities) of each fiber mat. FIG. 2 shows a tool having a wall 22 which defines the outer shape of a disc comprising fibers 11. In FIG. 2, the fibers have not yet been sprayed into outer interior area 29 of the tool. When the mat is configured as a ring or to include inner cavities, forms are used to provide both the outer and inner shapes of each fiber mat. This is illustrated in FIG. 3, in which the tool has an outer wall 32 and an inner wall 33 to define the shape created by fibers 11. The forms may advantageously be made to be reconfigurable, so that differently shaped preforms can be made using the apparatus shown in FIG. 1. Of specific interest are tools that possess contours producing fiber mats with slots as well as corresponding tabs for interlocking of individual layers.

In accordance with this invention, a computer may be used to direct the spray system such that the fiber spray follows a sequence of desired paths in the area between the outer contour (and any inner contour) of a form or reconfigurable tools defining the shape of the fiber mat.

This invention also contemplates a system to dispense binder into the chopped fiber tows and a system to melt or cure the binder, for instance by heat or ultraviolet light, thereby providing a fiber mat that can be handled.

Finally, this invention includes the use of a form (or reconfigurable tool) to sequentially assemble the fiber mats and any resin layers joining them together into stacks, and a press for compacting the fiber mat stack into a preform that is ready for densification and final machining into a useful article such as a friction brake component.

Figure 4:
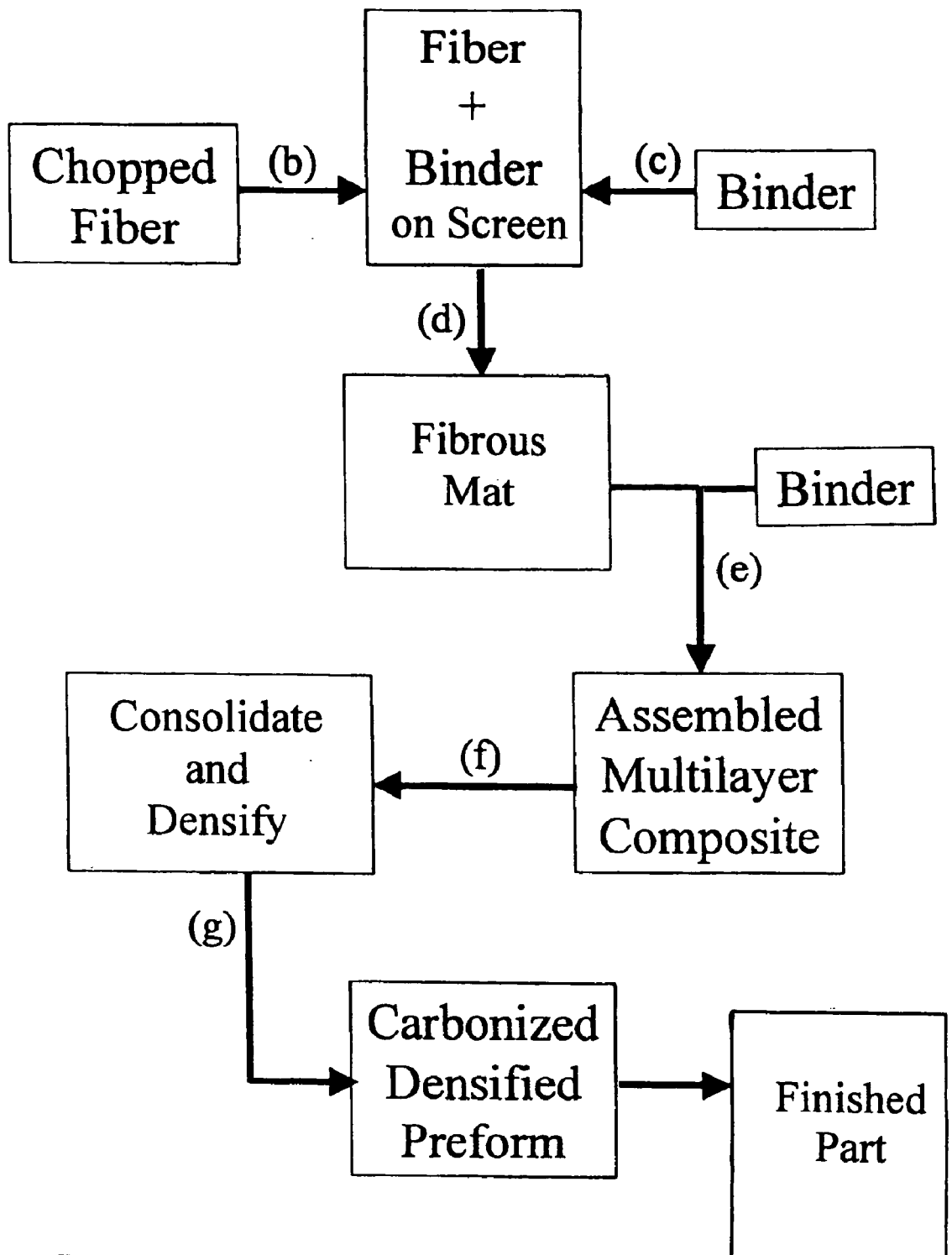
FIG. 4 is a block diagram illustrating aspects of a process of the present invention.
Figure 6A:
FIGS. 6A and 6B are photographs showing fiber detail.
Figure 6B:
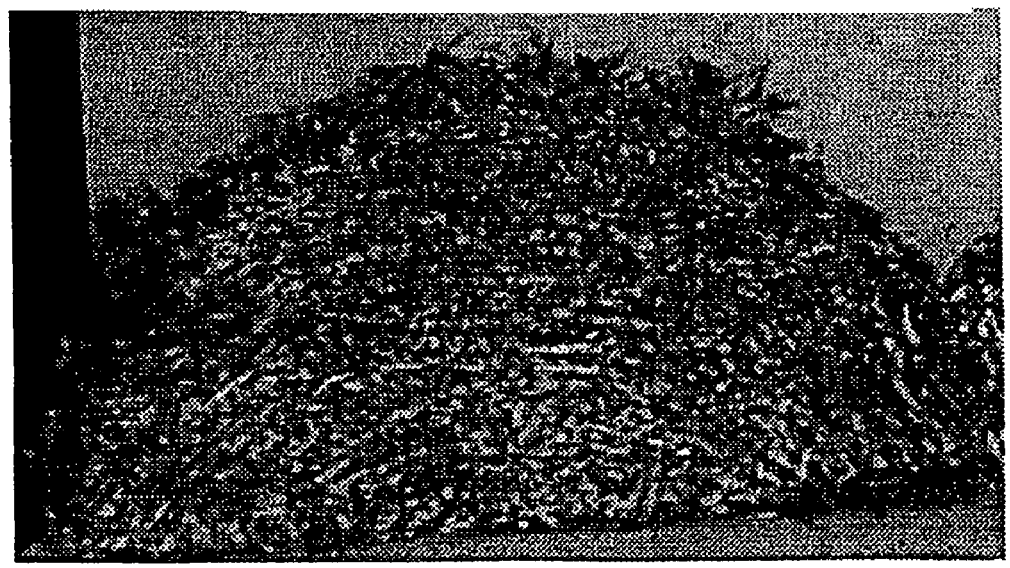

The present invention provides a system designed for the fabrication of preforms of thick, three-dimensional composite parts, such as preforms for carbon-carbon brake discs. While preforms made in accordance with this invention will often range in thickness from about 0.25 through about 7.5 inches, thicker (and thinner) preforms can be made in accordance with this invention. Individual layers of fiber mats of carbon fibers (pitch or polyacrylonitrile or combinations thereof) with defined reinforcement microstructures and defined overall shape are produced using a fiber spray system in combination with a powder binder application. Individual fiber mats are subsequently stacked such that a multi-layer composite preform is assembled. The individual fiber mats may be joined together by application of additional binder (preferably, phenolic resin binder) between the layers. Interlayer connectivity may be enhance by stitching layers together by needling, or the process can make use of built-in slots and tabs to provide for locking between individual layers of fibrous mats. FIG. 6A is a close up of a fiber mat before needling. FIG. 6B shows a fiber mat after needling. The composite preform may comprise three-dimensionally shaped mats that are tacked and assembled in more than one direction to provide interconnections conforming to stress paths, thus providing a desired three-dimensional preform architecture. If desired, additional filler and additive materials may be embedded within the composite preforms. For carbon-carbon composites, carborundum powder, graphites, carbon black, and cokes are of specific interest. Further processing of the so-produced preforms will generally include a step of carbonizing and densifying the preform, for instance by resin infusion and chemical vapor deposition. Aspects of this process are depicted schematically in FIG. 4.

Implementation of this invention may make use of a robotic process for chopping continuous fiber tows and spraying the chopped fiber tows—with control over fiber type, fiber lengths, fiber output rates, and fiber orientation—into a suit ably-shaped vacuum apparatus; Cutting of the continuous tow of fibers may be accomplished within a computer-controlled chopper head having rotation knives mounted on a six-axis robot. The chopped fibers are deposited onto a perforated screen through which a vacuum is drawn. A reconfigurable form (tool) is positioned on a vacuum screen, to provide the desired inner (if any) and outer outline of the fiber mat. A computer program controls the motion of the spray within the area between the inner and outer boundary of the fiber mat, such that the desired fiber coverage as well as fiber orientation is obtained. Fiber orientation is accomplished by the use of a fiber orientation device attached to the chopping device, or by a programmed interaction of the fiber spray with the walls defining the inner and outer mat boundary.

A system to dispense binder in powder form on the chopped fibers may also be included in this invention, along with a system to melt or cure the binder such that a fiber mat is provided which can be handled. In carrying out this invention, when employing a vacuum system connected to a screen onto which the chopped fiber tow is sprayed, a binder such as a polymeric binder may be sprayed on along with the fibers.

The apparatus for producing the fiber mats involves reconfigurable tools to provide the outer and inner contour of the desired fiber mat. Three-dimensionally shaped fiber mats are obtained by the use of vacuum screens, having a perforated screen in the form of a three-dimensional surface. A computer may be used to direct the fiber spray to follow a sequence of desired paths in the area between the outer and inner contours of the reconfigurable tool defining the inner and outer contours of the fiber mat. After the mat has been formed by depositing the fibers, the tooling providing the inner (if any) and outer boundaries of the mat are removed, and the fiber mat is consolidated by melting or curing the binder. The mat then retains its predefined shape and the fibers are held in position. Curing or melting the binder (depending on the resin system) may be accomplished by means such as heat or the application of ultra-violet light. Once the mat is processed as described above, it is removed from the screen. At this stage, the mat is capable of holding its shape for further handling and processing.

To accomplish the manufacture of preforms for thick multi-layer composite parts, a series of shaped fiber mats prepared as described above are stacked and assembled in a predefined sequence, as depicted for instance in FIG. 5. In FIG. 5, shaped fiber mats 51, 52, and 53 are combined to form the preform for the thick multi-layer composite part 55. Unlike the situation with conventional Laminated Object Manufacturing processes, there is no need to cut the individual layers into their final shape, because they are formed from the beginning into the requisite shape. In the method of this invention, the fibrous mats are assembled into a preform in the substantial absence of cutting or other mechanical modification. That is, each of the fibrous mats is shaped by the tool in which they are formed into the desired shape, and when multiple sheets are combined to make a preform, little or no trimming or smoothing of the preform is necessary.

This invention also contemplates a reconfigurable tool to sequentially assemble the fiber mats and resin layers into stacks. During the assembly process, slots and tabs for interlayer connectivity are appropriately aligned. Stitching or needling can be used to increase the interlaminar connectivity within the multi-layer preform. Additional binder (typically, phenolic resin for carbon-carbon brake preform applications) is placed between the individual layers, for instance in the form of sheets of phenolic resin by a process of Resin Film Infusion or by spraying the binder in liquid form or in powder deposition Depending on the resin system used as binder, a consolidation step is then conducted. In one embodiment of the invention, the stack of multiple layers of fiber mats is compacted in a heat-press to achieve the desired density within the part. The heat-pressing operation is normally conducted in a mold, preferably a reconfigurable mold, having the shape of the desired preform. In another embodiment, vacuum bagging is used to consolidate the preform. Alternatively, the multi-layer stack can be placed into a constraint fixture and inserted into a Resin Transfer Molding apparatus for densification.

In a processing embodiment, then, this invention provides a method of making a preform, which comprises the steps of: a.) providing a tool (or "mold"), preferably a reconfigurable tool, containing a perforated screen through which a vacuum can be drawn, b.) delivering chopped fiber to the tool while drawing vacuum through said tool, to form a fibrous object, c.) delivering binder to the fibrous object, d.) melting and/or curing the binder to make a fibrous mat, e.) assembling a plurality of the fibrous mats, together with additional binder, into the shape of a preform, and f.) heat-pressing the resulting mat assembly into a finished preform. Processing will generally include a subsequent step of g.) carbonizing and densifying the preform, for instance by resin infusion. Aspects of this process are depicted schematically in FIG. 4.

Modifications and variations of this invention as disclosed above will readily occur to those skilled in the art. For instance, structural preforms in a series of different geometries and internal fiber orientations may be formed by the present methods.

Technical Advantages

A technical advantage of the present invention is its enablement of the fabrication of parts with a predefined internal composite architecture. Each individual layer used to build up the composite preform could be designed to possess its own beneficial structural characteristics. This internal microstructure can be based on variations in fiber volume fraction, fiber type, fiber length, and fiber orientation. Also, if desired, useful fillers can be embedded into the preform between layers. For brake preforms, pitch and PAN fibers can be mixed, and fiber orientation can be adjusted to preferred load transfer conditions, especially in lug areas and heat transfer directions.

Another technical advantage of the present invention is its extension of the capabilities of Laminated Object Manufacturing. The use of fiber mats which each individually possesses a defined outer and inner contour eliminates the need for cutting processes during the LOM assembly step. This also reduces the amount of waste material, the amount of material to be densified by costly heat treatment processes and chemical vapor deposition, and facilitates the construction of laminated objects with internal cavities.

Furthermore, this invention enables the fabrication of objects assembled from non-planar microstructures. In accordance with this invention, fibrous mats can be produced on contoured or three-dimensional vacuum screens as well as on flat screens. This permits the design of complex microstructures that are not achievable with other processes.

Technical advantages are provided also in the manufacture of preforms for carbon-carbon composites for brakes. These composite parts possess a large cross-sectional dimension. For such preforms, pitch and PAN fibers can be mixed, and the reinforcement volume fractions, the fiber lengths, and the fiber orientation can be adjusted to preferred load transfer conditions (especially in lug area) and to heat transfer directions. In brake applications, interlaminar shear is an important factor. The use of contoured fibrous mats, the needling of fiber mats, the interlocking of such mats through associate tables and slots, can each provide for enhanced inter-mat interlocking, with resulting reduced interlaminar shear. Also, the out-of-plane directionality introduced into the preform by this approach aids in heat transfer in the through-thickness direction of the final composite part.

What is claimed is:

1. A method of making multi-layer composite preform having a desired shape and a thickness in the range 0.25 to 7.5 inches and comprising multiple layers of fibrous mats wherein each of said fibrous mats comprises a random carbon-containing fibrous body within which is distributed a polymeric binder and wherein adjacent mat layers are bound together by additional polymer binder, stitching, and interlocking tabs, which method comprises the steps of:
   a.) providing a tool for shaping a fibrous mat layer, said tool including a perforated screen through which a vacuum can be drawn, wherein said tool is reconfigurable such that differently shaped composite preforms can be manufactured in the tool,
   b.) configuring said tool to provide said desired shape,
   c.) delivering chopped fiber tow to said configured tool while drawing vacuum therethrough, to form a fibrous object having said desired shape,
   d.) delivering binder to said fibrous object,
   e.) melting or curing said binder to make a fibrous mat,
   f.) assembling a plurality of said fibrous mats and additional binder into said preform having said desired shape for a carbon-carbon composite part in the substantial absence of cutting or other mechanical modification, and
   g.) heat-pressing the resulting mat assembly into a finished preform.

2. The method of claim 1, wherein in step c.) said fibers comprise pitch fibers, polyacrylonitrile fibers, or mixtures thereof.

3. The method of claim 1, wherein in step d.) the binder is delivered in the form of a spray and wherein step d.) is conducted simultaneously with step c.).

4. The method of claim 1, wherein in step g.) said heat-pressing operation is conducted in a mold having the shape of the desired preform.

5. The method of claim 1, which further comprises the step of:
   h.) carbonizing and densifying said preform to provide a carbon-carbon composite.

* * * * *